United States Patent
Attia et al.

(10) Patent No.: US 8,028,583 B2
(45) Date of Patent: Oct. 4, 2011

(54) METHOD AND DEVICE FOR IDENTIFYING SQUEAKING NOISES

(75) Inventors: Fawzi Attia, Winnenden (DE); Michael Fischer, Niefern-Oeschelbronn (DE); Winfried Keiper, Tamm (DE); Thomas Zoeller, Gerlingen (DE); Uwe Bretz, Obersulm (DE); Mats Karlsson, Ludwigsburg (DE); Uwe Martin, Ludwigsburg (DE); Michael Raquet, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 12/064,805

(22) PCT Filed: Jul. 7, 2006

(86) PCT No.: PCT/EP2006/064023
§ 371 (c)(1),
(2), (4) Date: Aug. 4, 2008

(87) PCT Pub. No.: WO2007/023021
PCT Pub. Date: Mar. 1, 2007

(65) Prior Publication Data
US 2009/0019936 A1    Jan. 22, 2009

(30) Foreign Application Priority Data
Aug. 25, 2005    (DE) .................... 10 2005 040 192

(51) Int. Cl.
*G01D 7/00*    (2006.01)
(52) U.S. Cl. .......................................... 73/659; 73/579
(58) Field of Classification Search ............... 73/649, 73/659, 584, 579, 587
See application file for complete search history.

(56) References Cited

U.S. PATENT DOCUMENTS

| | | | | |
|---|---|---|---|---|
| 3,892,133 A * | 7/1975 | Quinn | | 73/647 |
| 3,948,345 A * | 4/1976 | Rosencwaig | | 73/579 |
| 4,550,603 A * | 11/1985 | Fukada et al. | | 73/587 |
| 5,058,434 A * | 10/1991 | Zaschel | | 73/659 |
| 5,532,678 A * | 7/1996 | Kin et al. | | 340/438 |
| 5,586,028 A * | 12/1996 | Sekine et al. | | 701/1 |
| 5,728,938 A * | 3/1998 | Choi et al. | | 73/593 |
| 5,852,243 A * | 12/1998 | Chang et al. | | 73/659 |
| 6,332,362 B1 * | 12/2001 | Lee et al. | | 73/659 |
| 6,439,053 B1 * | 8/2002 | Bobulski | | 73/579 |
| 6,822,929 B1 * | 11/2004 | Schubert et al. | | 367/181 |
| 6,898,976 B2 * | 5/2005 | Kamiya et al. | | 73/593 |

(Continued)

FOREIGN PATENT DOCUMENTS

DE    197 49 372    5/1999

(Continued)

OTHER PUBLICATIONS

Eichner et al. (Translation of DE 10133987 A1), Feb. 6, 2003.*

(Continued)

*Primary Examiner* — Hezron E Williams
*Assistant Examiner* — Samir Shah
(74) *Attorney, Agent, or Firm* — Kenyon & Kenyon LLP

(57) ABSTRACT

A method for detecting squeaking noises within a sound signal generated during operation of a motor vehicle or during operation of a component thereof is described; in this method the sound signal is detected; an amplitude spectrum of the sound signal representing the amplitude distribution in a frequency range is generated at a minimum of two points in time and the existence of a squeaking noise is detected by analysis of the at least two amplitude spectra.

19 Claims, 2 Drawing Sheets

U.S. PATENT DOCUMENTS

| | | | |
|---|---|---|---|
| 6,925,879 B2 * | 8/2005 | Raichle | 73/579 |
| 6,954,146 B2 * | 10/2005 | Bhagavathula et al. | 340/566 |
| 7,124,637 B2 * | 10/2006 | Singhal et al. | 73/659 |
| 7,248,958 B2 * | 7/2007 | Watanabe et al. | 701/70 |
| 7,509,861 B2 * | 3/2009 | Masotti et al. | 73/659 |
| 7,640,139 B2 * | 12/2009 | Sahara et al. | 702/183 |
| 2004/0212516 A1 | 10/2004 | Bhagavathula et al. | |
| 2009/0019936 A1 | 1/2009 | Attia et al. | |

FOREIGN PATENT DOCUMENTS

| | | |
|---|---|---|
| DE | 101 33 987 | 2/2003 |
| DE | 10133987 A1 * | 2/2003 |
| DE | 102 60 723 | 3/2004 |
| DE | 102 507 39 | 5/2004 |
| EP | 0 671 610 | 9/1995 |
| EP | 1 431 728 | 6/2004 |
| WO | WO 03/038426 | 5/2003 |
| WO | WO 03038426 A1 * | 5/2003 |
| WO | WO 2004/040246 | 5/2004 |

OTHER PUBLICATIONS

Database Inspec [Online], The Institution of Electrical Engineers, Stevenage, GB; 2004, Masaaki H: "High Frequency Sounds Radiated from Rails," XP002417920, Database Accession No. 8410698, 18th International Congress on Acoustics, Apr. 4-9, 2004, Kyoto, Japan, Apr. 4, 2004, pp. IV-3223-IV-3226, XP008074050, 8th International Congress on Acoustics, Science Council of Japan, ISBN: 4-9901915-6-0, pp. IV-3224, left-hand column; figure 4.

Dai et al., "Subjective response simulation of brake squeal noise applying neural network approach," Noise Control Eng. J., 2003, Band 51, S. 50-59.

* cited by examiner

METHOD AND DEVICE FOR IDENTIFYING SQUEAKING NOISES

FIELD OF THE INVENTION

The present invention relates to a method and device for identifying squeaking noises.

BACKGROUND INFORMATION

Noises occurring during operation of a motor vehicle or components thereof have often proven to be annoying for the driver and the environment and should be detected to the extent possible to allow noise abatement measures.

German Published Patent Application No. 102 60 723 describes a method for suppressing shifting noises during the test triggering of valves and pumps in the hydraulic system of a brake circuit. Triggering is performed over such a short interval of time that there is no mechanical or noise generating response on the part of the component being triggered.

SUMMARY

An example embodiment of the present invention relates to a method for detecting squeaking noises within a sound signal generated during operation of a motor vehicle or during operation of a component thereof, in which
the sound signal is detected
an amplitude spectrum of the sound signal representing the amplitude distribution in a frequency range is generated at a minimum of two points in time and
the existence of a squeaking noise is detected by analyzing the at least two amplitude spectra.

It is thus possible to detect squeaking noises in a sound signal in a simple and reliable manner.

An example embodiment of the present invention is characterized in that the squeaking noises are brake squeaking noises. Brake squeaking noises are particularly annoying for the driver of the vehicle and for the surroundings.

An example embodiment of the present invention is characterized in that
each of the two amplitude spectra is ascertained by a frequency analysis of a signal over time,
the signal over time extends over a different chronological section of the signal in each case.

Therefore, signal analyses that are offset in time are available and this also makes it possible to ascertain the length a squeaking noise in time.

An example embodiment of the present invention is characterized in that
the signal characteristic over time is sampled and
the chronological signal section extends over a predetermined number of sampling points.

An example embodiment of the present invention is characterized in that
the signal characteristic over time is sampled with a signal sampling frequency of 48 kHz and each signal section includes 4096 sampling points.

These numerical values may be particularly suitable.

An example embodiment of the present invention is characterized in that the signal sections overlap; the overlap equals 50% of the chronological length of the signal section in particular.

An example embodiment of the present invention is characterized in that
a smoothed amplitude spectrum is formed from each of the at least two amplitude spectra and
the existence of a squeaking noise is detected by analyzing the at least two amplitude spectra and the at least two smoothed amplitude spectra.

It is thus possible to gain information about the noise contained in the sound signal.

An example embodiment of the present invention is characterized in that the smoothing is performed by arithmetic averaging of the sound pressure levels ascertained from the amplitude spectrum over predetermined frequency sections, the frequency sections having a length of one third in particular.

An example embodiment of the present invention is characterized in that the existence of a squeaking noise is detected by analyzing signal peaks in the amplitude spectra. This utilizes the property whereby squeaking noises are manifested in signal peaks.

An example embodiment of the present invention is characterized in that signal peaks within the frequency interval of a squeaking noise are detected for recognition of the existence of a squeaking noise for a predetermined minimum number of analyses of amplitude spectra that follow one another in time. This makes it possible to rule out incorrect detection of randomly occurring individual signal peaks as a squeaking noise.

An example embodiment of the present invention is characterized in that a squeaking noise is detected as no longer being present if a signal peak is no longer detected for another predetermined minimum number of analyses of amplitude spectra that follow one another directly in time in the same frequency interval.

An example embodiment of the present invention is characterized in that the entire frequency range to be analyzed is divided into overlapping frequency intervals.

An example embodiment of the present invention is characterized in that a signal peak is detected as being present in a frequency interval if
the value ascertained for the signal peak in this frequency interval exceeds a predefinable threshold value and
the value ascertained for the signal peak is greater by at least one preselectable value than the value of the corresponding signal at the edges of the frequency interval.

An example embodiment of the present invention is characterized in that
a smoothed amplitude spectrum is formed from each of the at least two amplitude spectra and
a signal peak in a frequency interval is detected as being present if additionally
the value ascertained for the signal peak in this frequency interval is greater than the value of the signal ascertained from the smoothed amplitude spectrum at the same frequency of the frequency interval and
the value ascertained for the signal peak is greater by at least one preselectable value than the value of the signal ascertained from the smoothed amplitude spectrum at the edges of the frequency interval.

An example embodiment of the present invention is characterized in that
to detect the existence of a squeaking noise, a deviation quantity that characterizes the average deviation of the frequency of the detected signal peaks from the midfrequency of the frequency interval is ascertained
and the existence of a squeaking noise is deduced as a function of this deviation.

An example embodiment of the present invention is characterized in that the existence of a squeaking noise is deduced if the deviation quantity exceeds a preselected threshold value in a direction such that the particular deviation belonging to the deviation quantity is increased. This utilizes the property whereby interfering signals have a lower standard deviation about their mid-frequency than brake-generated squeaking events.

An example embodiment of the present invention is characterized in that the existence of a squeaking noise is deduced when the deviation quantity exceeds a predetermined threshold value in a direction such that the deviation belonging to the deviation quantity is reduced.

An example embodiment of the present invention is characterized in that
- intensity quantities describing the loudness of the squeaking noises are additionally assigned to the squeaking noises as a function of the height of the signal peaks and
- the main frequency of the squeaking noise is determined as a function of the intensity quantities and the frequencies of the signal peaks.

It is thus possible to determine the most important frequencies of the squeaking noise when there are multiple frequencies.

In addition, an example embodiment of the present invention also includes a device including device(s) for implementing the methods according to example embodiments of the present invention.

The example embodiments of the method according to the present invention are also manifested as example embodiments of the device according to the present invention and vice-versa.

DETAILED DESCRIPTION

For an airborne sound signal $x(n)$ sampled at frequency $f_s$, its spectrogram $X(f, n)$ is calculated. The spectrogram is a representation of the frequency content of signal $x(n)$ as a function of time. A spectrogram is made up of individual frequency spectra $Xi(f)$, each being calculated for signal sections $xi=x(m+i)$, $m=0, \ldots N-1$ and representing the frequency content of this chronological signal section. Signal sections may overlap due to the choice of i. To improve the representation in the frequency range for practical applications, each signal section xi is multiplied by a window function. It is expedient to represent the amplitude values in the spectrogram as sound pressure levels in dB. The following parameter values may be particularly suitable for detecting the squeaking of brakes:
- signal sample frequency $f_s=48$ kHz,
- length of a signal section: N=4096 sampling points,
- 50% signal section overlap, i.e., 2048 sampling points,
- each signal section is multiplied by a Hanning window of length N.

A smoothed spectrogram $S(f, n)$ is also calculated from measurement signal $x(n)$ according to the above method. Individual spectra $Si(f)$ are calculated here from signal sections xi in a manner analogous to the above method and are smoothed by replacing the amplitude values within certain frequency bands with their average. Signal peaks at individual frequencies such as those which occur with squeaking noises, for example, are suppressed by this averaging, yielding a representation of the noise contained in the signal. These smoothed amplitude spectra are referred to as $Si(f)$.

For the practical application of the detection of the squeaking of brakes, the smoothing of spectra $Xi(f)$ is formed by arithmetic averaging of the sound pressure level in frequency sections of one third. The other parameters for calculating the smoothed spectrum correspond to the values given above.

Figure 1:
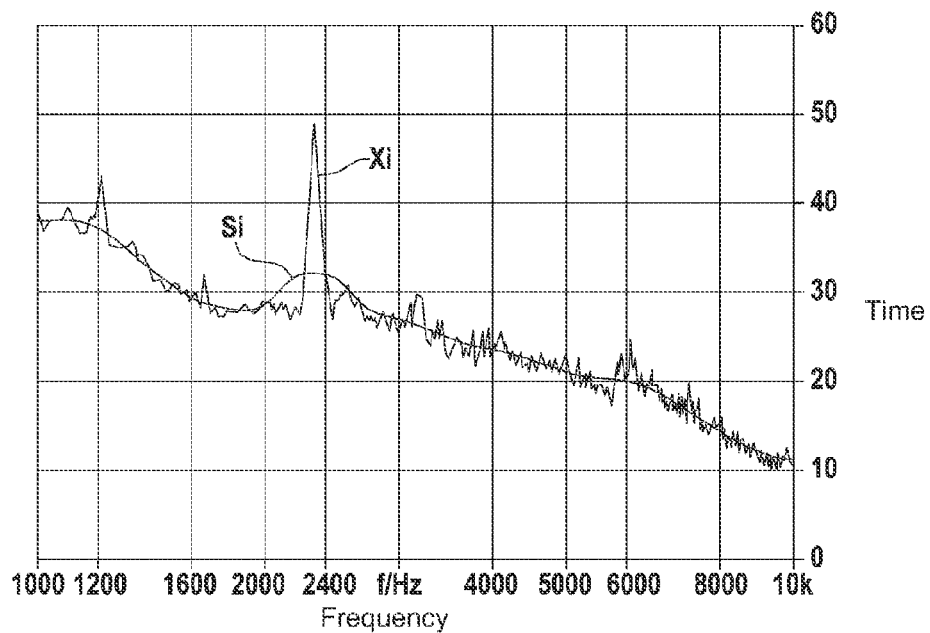
FIG. 1 shows an exemplary spectrum Xi and a smoothed spectrum Si belonging thereto. The peak seen at approximately f=2.3 kHz originates from a squeaking noise.

FIG. 1 shows an example of a spectrum $Xi(f)$ (jagged line) and a corresponding smoothed spectrum $Si(f)$ (smooth steady line). The peak of Xi at f≈2.3 kHz is attributable to a squeaking sound. In FIG. 1, frequency f is plotted on the abscissa and unsmoothed spectrum Xi and smoothed spectrum Si are plotted on the ordinate.

To detect broadband interference signals such as speech, before searching for squeaking noises, the signal is scanned for signal peaks using the signal peak detection method described below. Broadband noises are also characterized in that signal peaks are detected in a frequency-time range by this signal peak detection method.

The extent of this frequency-time range is adjusted according to practical requirements. Likewise, a definition is also established for how many signal peaks must be detected by this signal peak detection method per frequency-time range in order for a broadband interference signal to be detected as being present which means that no squeaking is present.

For detection of squeaking noises, spectrogram $X(f, n)$ is analyzed for signal peaks in all frequency-time ranges not already ruled out by the search for interference noise, with the help of the signal peak detection method described below. The following values are suitable for the braking noises:
- C=14 dB,
- w=0.0276,
- fGl=800 Hz and
- fGu=$f_s$/3 or 20 kHz if $f_s$(3)>20 kHz (i.e., fGu=min($f_s$/3, 20 kHz)).

For C and w in particular, deviations from the specified values are possible; with respect to C, the value range from 7 dB to 17 dB is suitable; the value range from 0.025 to 0.175 is suitable for w.

After conclusion of this search, the information about the detected signal peaks and each point in time n is available for each frequency fc in the range considered. Related frequency-time ranges representing squeaking noises are sought below. To do so, all points in time n are taken into account for each frequency fc for which a signal peak has been found, and there is a determination of whether a signal peak has been detected by the signal peak detection method at successive points in time j and j+1. This requires a minimum number k of signal peaks directly following one another in time in a frequency range around fc in order to be detected as a squeaking noise.

If there are at least k signal peaks with a time relationship, time gaps of a maximum period of time 1 between the signal peaks are also allowed in the further search about frequency fc along points in time n and are attributed to the period of the detected squeaking nose. This procedure is based on the fact that in order for noise to perceived by a human,
- it must persist for a minimum period of time and
- its perception by a human must be hardly affected by time masking effects that are briefer than a certain period of time.

If the time gap between two signal peaks exceeds period of time 1, this period of time is no longer attributed to the total length of a squeaking noise. If the time gap between signal peaks and/or sequences of signal peaks with a time relationship exceeds a period of time gmax, the detected sequences of signal peaks are no longer treated as one squeaking event but instead are treated as two squeaking events. The starting and stopping points in time of each detected squeaking event q are stored as tqstart and tqend, respectively.

Figure 2:
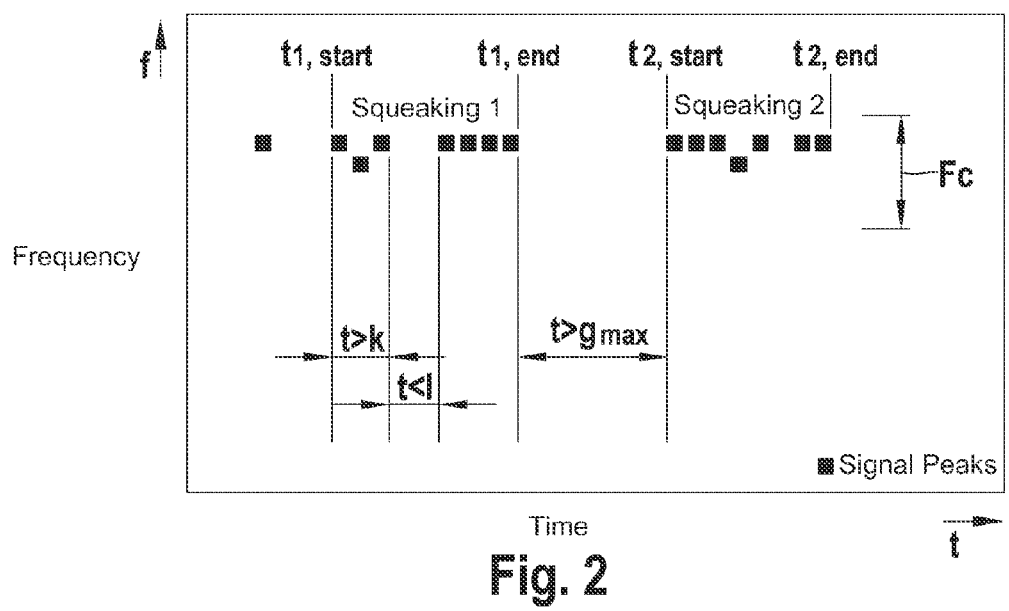
FIG. 2 illustrates the principle of searching for squeaking noises in a frequency-time range. Signal peaks are marked as black squares.

FIG. 2 illustrates the principle of searching for squeaking events in a frequency-time range. The signal peaks detected with the signal peak detection method are marked as black squares. In FIG. 2, time t is plotted on the abscissa and frequency f on the ordinate. In the example in FIG. 2, two squeaking events, labeled as "squeaking 1" and "squeaking 2," are detected. Each of the two squeaking events includes seven detected signal peaks; in "squeaking 1" there is a time gap between the third and fourth squeaking events, but it is not greater than the maximum allowed period of time 1. There is a time gap between the two squeaking events, the duration of which exceeds value gmax. Therefore, these are two separate squeaking events. A frequency window of width Fc is shown on the ordinate at the right. This frequency window has been searched with regard to the squeaking event. The search for squeaking events in frequency windows about mid-frequency fc has not yet yielded actual mid-frequency fq of the q-th squeaking event. However, fq occurs in frequency window Fc about mid-frequency fc. This is due to the fact that all brake-generated squeaking noises actually occurring extend over several frequencies close together, one of which has the highest level over the period of time of the squeaking event.

This frequency is defined as actual frequency fq of the squeaking event. To ascertain fq, all spectra Xi occurring within points in time tqstart and tqend are combined to form a new average spectrum Xqavg by replacing all amplitude values of a frequency f with their arithmetic mean. Squeaking frequency fq is the frequency within window Fc for which Xqavg is at the maximum level. This level Lq is stored as the representative value for squeaking event q.

The signal peak detection method is described below.

Signal peaks are found by analyzing spectra Xi and Si and a defined frequency-dependent threshold value Th(f). The sound pressure level in dB may be used as the unit for spectra Xi and Si as well as threshold value Th. The search for peak values may be limited to frequencies between a lower cutoff frequency fGl and an upper cutoff frequency fGu. Each spectrum Xi is subdivided into frequency windows Fc about mid-frequencies fc. Each frequency window Fc extends from its lower window frequency
fcl=fc*(1−w)
up to its upper window frequency
fcu=fc*(1+w)
where w is a selectable factor. The value of w=0.0276 is particularly suitable.

Successive windows Fc and Fc+1 may overlap, depending on the choice of mid-frequencies. For each Fc in Xi, the maximum value of spectrum Xi will now be sought for all frequencies f, where fcl<f≦fcu within Fc. The detected maximum value is referred to as Lmax. A signal peak in Xi at frequency f=fc is marked as having been found when all of the following six conditions have been met:
1) Lmax>Th(fc)
2) Lmax>Xi(fcl)+C
3) Lmax>Xi(fcu)+C
4) Lmax>Si(fc)
5) Lmax>Si(fcl)+C
6) Lmax>Si(fcu)+C
where Th(f) is a frequency-dependent threshold value and thus Th(fc) is the threshold value at f=fc and C is a constant. C=14 dB is very suitable.

These six conditions ensure that

Lmax will be sufficiently large (condition 1)).

Lmax is higher than the value of the unsmoothed spectrum by at least C at limits fcl and fcu of the range in question (conditions 2) and 3)). This means that the maximum must be localized to a sufficiently great extent and must be pronounced. This rules out the possibility that very loud noises whose spectrum has a very large value for all frequencies may be incorrectly detected as squeaking.

Lmax is greater than the value of smoothed spectrum Si at f=fc (condition 4)).

Lmax is higher than the value of the smoothed spectrum by at least C at limits flc and fcu of the range in question (conditions 5) and 6)).

With the method described here, multiple parallel signal peaks may of course also be detected at any point in time if several of the investigated frequency windows of spectrum Xi have a signal peak.

In practice, squeaking noises usually occur at a basic frequency f0 and two to three harmonics at frequencies f=f0*n, where n=2, 3, 4. In practical applications, the windows are so narrow that there may be only one squeaking noise in one window. For example, at a frequency of 800 Hz, the window size is approximately 90 Hz. The first harmonic of a squeaking noise falling in the window occurs at 1600 Hz, so it is far outside of the window.

Figure 3:
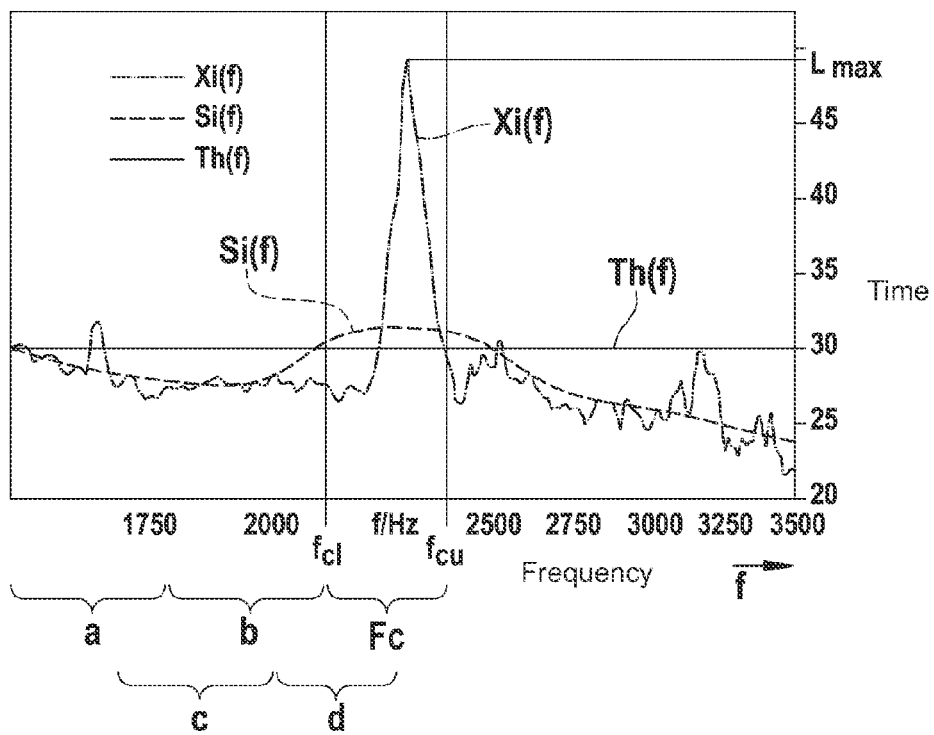
FIG. 3 illustrates the detection of signal peaks based on a spectrum Xi, of a smoothed spectrum Si and a threshold value Th.

In FIG. 3 the following quantities are plotted on the ordinate as a function of frequency f, which is plotted on the abscissa:
Xi(f), which is the unsmoothed amplitude spectrum of signal detail xi,
Si(f), which is the smoothed amplitude spectrum of signal detail xi and
threshold value Th, which is assumed here to be independent of frequency.

In addition, edge points fcl and fcu of the frequency window are also shown on the abscissa. For the sake of illustration, FIG. 3 shows as an example four additional frequency windows labeled as a, b, c and d beneath the abscissa. This illustrates clearly that the frequency axis may be divided into multiple frequency windows, with the frequency windows overlapping in particular. Using the signal peak detection method described here, only signal peaks situated approximately at the center of a frequency window are detected. If a signal peak is at the edge of a frequency window, it is not recognized because of the failure to fulfill conditions 2) and 3). However, due to the overlap of the frequency windows, e.g., by 50%, such a signal peak falls approximately in the middle of the neighboring frequency window and is recognized when the signal peak detection method is applied to this neighboring frequency window.

Under real measurement conditions in the vehicle, there may be interference, which is very similar to the squeaking noises in your frequency-time structure. This interference, i.e., interference frequency components, may originate from signal tones of measurement equipment, for example, when there is a decline in battery capacitance or narrow-band input from electronic systems. This interference must be differentiated from squeaking events caused by braking. This differentiation is based on an analysis of the distribution of amplitude values about mid-frequency fq of a squeaking event q within points in time tqstart and tqend. It has been found that the above-mentioned interference signals have a lower standard deviation of their amplitude values about a mid-frequency fq than do squeaking events generated by brakes. It is thus possible to ascertain whether this event may be evaluated as being caused by braking or not caused by braking by analyzing the amplitude distributions about a squeaking frequency fq over the total period of time of the event, which extends in time from tqstart to tqend.

In practice, multiple squeaking frequencies are often excited simultaneously during a braking operation. To select one of these frequencies as the main frequency, it is possible to use an approach based on the perception of sound by humans. To do so, the particular specific loudness is calculated and compared for all squeaking frequencies. The frequency of the squeaking event having the higher specific loudness is selected as the main frequency. Due to the strong correlation between loudness and subjectively perceived annoyance of a sound, as demonstrated in hearing tests, the squeaking event in a signal which is most annoying for the hearer is analyzed as representative for the signal as a whole.

To determine the main squeaking frequencies over all braking operations, e.g., all measurements on one day, it is possible to proceed as follows. The specific loudness of all squeaking events is added up within a frequency window Fmain. Fmain slides over all frequencies between FGl and FGu. This yields a diagram of the specific loudness values added up for all squeaking events that occur as a function of frequency. Peak values are sought in a sliding window Fmov, which has a greater bandwidth than Fmain over these added-up loudness values. Beginning with the highest peak values found, individual main frequencies are derived from the particular frequencies. Due to this procedure, the influence of the specific loudness on the annoying nature of a squeaking event is taken into account and the incidence of occurrence of individual squeaking frequencies is taken into account. For practical applications, determination of four main frequencies is advisable. For Fmain and/or Fmov, windows having a relative bandwidth of $\frac{1}{16}$ octave (for Fmain) and/or one third (for Fmov) are suitable.

Figure 4:
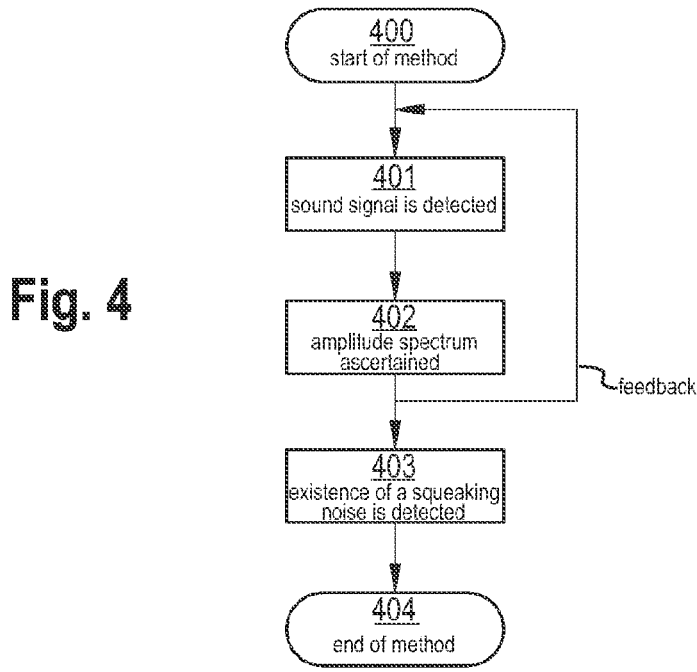
FIG. 4 shows the basic sequence of the method according to an example embodiment of the present invention.

The basic sequence of the method according to an example embodiment of the present invention is depicted in FIG. 4. After the start of the method in block 400, the sound signal is detected in block 401 and its amplitude spectrum is ascertained in block 402. After block 402, there is feedback to block 401, i.e., the sound signal is detected at a later point in time. In block 403 the existence of a squeaking noise is detected by analysis of the at least two amplitude spectra. This method ends in block 404.

What is claimed is:

1. A method for detecting squeaking noises within a sound signal generated during operation of at least one of (a) a motor vehicle and (b) at least one component of a motor vehicle, comprising:
   detecting the sound signal;
   generating an amplitude spectrum of the sound signal representing an amplitude distribution in a frequency range at a minimum of two points in time;
   forming a smoothed amplitude spectrum from each of the at least two amplitude spectra; and
   detecting an existence of a squeaking noise by analyzing the at least two amplitude spectra and the at least two smoothed amplitude spectra, wherein:
      the existence of a squeaking noise is detected by analyzing signal peaks in the amplitude spectra and comparing the signal peaks to values of the signal ascertained from the smoothed amplitude spectrum.

2. The method according to claim 1, wherein the squeaking noises include brake squeaking noises.

3. The method according to claim 1, wherein:
   each of the two amplitude spectra is ascertained by a frequency analysis of a signal characteristic over time, and the signal characteristic over time extends over a different chronological signal section in each case.

4. The method according to claim 3, wherein:
   the signal characteristic over time is sampled; and
   the chronological signal section extends over a predetermined number of sampling points.

5. The method according to claim 4, wherein the signal characteristic over time is sampled with a signal sampling frequency of 48 kHz and each signal section includes 4096 sampling points.

6. The method according to claim 3, wherein the signal sections overlap, the overlap being equal to 50% of the chronological length of the signals section.

7. The method according to claim 1, wherein smoothing is performed by arithmetic averaging of a sound pressure level ascertained from the amplitude spectrum over predetermined frequency sections, the frequency sections having a length of one third octave.

8. The method according to claim 1, wherein the existence of a squeaking noise is detected by analyzing signal peaks in the amplitude spectra.

9. The method according to claim 8, wherein, to detect the existence of a squeaking noise, signal peaks within a same frequency interval are detected for a predetermined minimum number of analyses of chronologically successive amplitude spectra.

10. The method according to claim 9, wherein a squeaking noise is detected as no longer being present if no further signal peaks are detected for another predetermined minimum number of analyses of chronologically immediately successive amplitude spectra in the same frequency interval.

11. The method according to claim 9, wherein an entire frequency range to be analyzed is divided into overlapping frequency intervals.

12. The method according to claim 9, wherein
   to detect a presence of a squeaking noise, a deviation quantity that characterizes a mean deviation of the frequency of the detected signal peaks from a mid-frequency of the frequency interval is ascertained; and
   the existence of a squeaking noise is deduced as a function of the deviation quantity.

13. The method according to claim 8, wherein:
   intensity quantities describing a loudness of the squeaking noises are additionally allocated to the squeaking noises as a function of a height of the signal peaks; and
   a main squeaking frequency is determined as a function of the intensity quantities and the frequencies of the signal peaks.

14. The method of claim 1, wherein a signal peak is detected as being present in a frequency interval when:
   an ascertained value of the signal peak in the frequency interval exceeds a preselectable threshold value;
   the ascertained value of the signal peak in the frequency interval is greater than the value of the signal ascertained from the smoothed amplitude spectrum at the same frequency of the frequency interval; and
   the ascertained value of the signal peak is greater by at least a preselectable value than the value of the signal at the edges of the frequency interval as ascertained from the smoothed amplitude spectrum.

15. A method for detecting squeaking noises within a sound signal generated during operation of at least one of (a) a motor vehicle and (b) at least one component of a motor vehicle, comprising:
   detecting the sound signal;

generating an amplitude spectrum of the sound signal representing an amplitude distribution in a frequency range at a minimum of two points in time; and detecting an existence of a squeaking noise by analyzing the at least two amplitude spectra, wherein:

the existence of a squeaking noise is detected by analyzing signal peaks in the amplitude spectra;

to detect the existence of a squeaking noise, signal peaks within a same frequency interval are detected for a predetermined minimum number of analyses of chronologically successive amplitude spectra, and a signal peak is detected as being present in a frequency interval when:

an ascertained value of the signal peak in the frequency interval exceeds a preselectable threshold value; and the ascertained value of the signal peak is greater by at least a preselectable value than a value of a corresponding signal at edges of the frequency interval, the preselectable value at least one of (a) equaling 14 dB and (b) between 7 dB and 17 dB.

16. The method according to claim 15, wherein:

a smoothed amplitude spectrum is formed from each of the at least two amplitude spectra; and a signal peak is detected as being present in a frequency interval when in addition:

the ascertained value of the signal peak in the frequency interval is greater than the value of the signal ascertained from the smoothed amplitude spectrum at the same frequency of the frequency interval; and the ascertained value of the signal peak is greater by at least a preselectable value than the value of the signal at the edges of the frequency interval as ascertained from the smoothed amplitude spectrum.

17. A method for detecting squeaking noises within a sound signal generated during operation of at least one of (a) a motor vehicle and (b) at least one component of a motor vehicle, comprising:

detecting the sound signal;

generating an amplitude spectrum of the sound signal representing an amplitude distribution in a frequency range at a minimum of two points in time; and detecting an existence of a squeaking noise by analyzing the at least two amplitude spectra, wherein:

the existence of a squeaking noise is detected by analyzing signal peaks in the amplitude spectra;

to detect the existence of a squeaking noise, (i) signal peaks within a same frequency interval are detected for a predetermined minimum number of analyses of chronologically successive amplitude spectra, and (ii) a deviation quantity that characterizes a mean deviation of the frequency of the detected signal peaks from a mid-frequency of the frequency interval is ascertained;

the existence of a squeaking noise is deduced as a function of the deviation quantity; and the existence of a squeaking noise is inferred if the deviation quantity exceeds a preselectable threshold value in a direction such that the deviation belonging to the deviation quantity is increased.

18. A device, comprising:

an arrangement configured to perform a method for detecting squeaking noises within a sound signal generated during operation of at least one of (a) a motor vehicle and (b) at least one component of a motor vehicle, the method including:

detecting the sound signal;

generating an amplitude spectrum of the sound signal representing an amplitude distribution in a frequency range at a minimum of two points in time;

forming a smoothed amplitude spectrum from each of the at least two amplitude spectra; and detecting an existence of a squeaking noise by analyzing the at least two amplitude spectra and the at least two smoothed amplitude spectra, wherein:

the existence of a squeaking noise is detected by analyzing signal peaks in the amplitude spectra and comparing the signal peaks to values of the signal ascertained from the smoothed amplitude spectrum.

19. The device of claim 18, wherein a signal peak is detected as being present in a frequency interval when:

an ascertained value of the signal peak in the frequency interval exceeds a preselectable threshold value;

the ascertained value of the signal peak in the frequency interval is greater than the value of the signal ascertained from the smoothed amplitude spectrum at the same frequency of the frequency interval; and the ascertained value of the signal peak is greater by at least a preselectable value than the value of the signal at the edges of the frequency interval as ascertained from the smoothed amplitude spectrum.

* * * * *